(12) United States Patent
Fraley et al.

(10) Patent No.: US 8,393,136 B1
(45) Date of Patent: Mar. 12, 2013

(54) CONCAVE DECK FLEXIBLE HITCH CUTTER

(75) Inventors: J. Phillip Fraley, Winfield, AL (US); John W. Davis, III, Winfield, AL (US)

(73) Assignee: Kink Kutter, Inc., Winfield, AL (US)

( * ) Notice: Subject to any disclaimer, the term of this patent is extended or adjusted under 35 U.S.C. 154(b) by 0 days.

(21) Appl. No.: 12/603,408

(22) Filed: Oct. 21, 2009

Related U.S. Application Data

(60) Provisional application No. 61/107,159, filed on Oct. 21, 2008.

(51) Int. Cl.
*A01D 67/00* (2006.01)
(52) U.S. Cl. ........................... 56/320.1; 56/17.1
(58) Field of Classification Search .............. 56/14.9, 56/15.2, 15.6, 15.8, 15.9, 320.1, 16.7, 16.9, 56/17.1, 320.2
See application file for complete search history.

(56) References Cited

U.S. PATENT DOCUMENTS

| | | | | |
|---|---|---|---|---|
| 2,867,963 A * | 1/1959 | Lawrence et al. | | 56/295 |
| 3,005,302 A * | 10/1961 | Maxon et al. | | 56/320.1 |
| 3,043,082 A * | 7/1962 | Kulak et al. | | 56/503 |
| 3,053,033 A * | 9/1962 | Maguire | | 56/13.6 |
| 4,258,535 A * | 3/1981 | Jones et al. | | 56/13.6 |
| 4,916,889 A * | 4/1990 | Molstad | | 56/14.9 |
| 5,086,614 A * | 2/1992 | Pestka | | 56/17.2 |
| 5,657,620 A * | 8/1997 | Thagard et al. | | 56/15.2 |
| 5,765,348 A * | 6/1998 | Thagard et al. | | 56/15.2 |
| 5,873,228 A * | 2/1999 | Kirch | | 56/15.1 |
| 6,052,980 A * | 4/2000 | Friesen | | 56/320.1 |
| 6,116,007 A * | 9/2000 | Eggena et al. | | 56/15.1 |
| 6,467,247 B1* | 10/2002 | Harrison et al. | | 56/320.1 |
| 6,546,707 B2* | 4/2003 | Degelman et al. | | 56/15.2 |
| D501,215 S * | 1/2005 | Steele et al. | | D15/17 |
| D547,332 S * | 7/2007 | Degelman et al. | | D15/17 |
| 2005/0126143 A1* | 6/2005 | Tironi | | 56/6 |
| 2005/0198933 A1* | 9/2005 | Klein et al. | | 56/320.1 |
| 2009/0205306 A1* | 8/2009 | Foster, III | | 56/13.6 |

* cited by examiner

*Primary Examiner* — Thomas B Will
*Assistant Examiner* — Joan D Misa
(74) *Attorney, Agent, or Firm* — Angela Holt; Bradley Arant Boult Cummings LLP

(57) ABSTRACT

A rotary mower has a concave cutting deck. The deck comprises three curved plates welded to two longitudinal supports. Concavity is provided in the longitudinal and transverse directions. The lift frame assembly comprises swiveling linkages that allow rotation of the deck with respect to a three point hitch. The lift frame assembly further comprises a pivot brace on the top of the frame for further rotation of the deck.

6 Claims, 5 Drawing Sheets

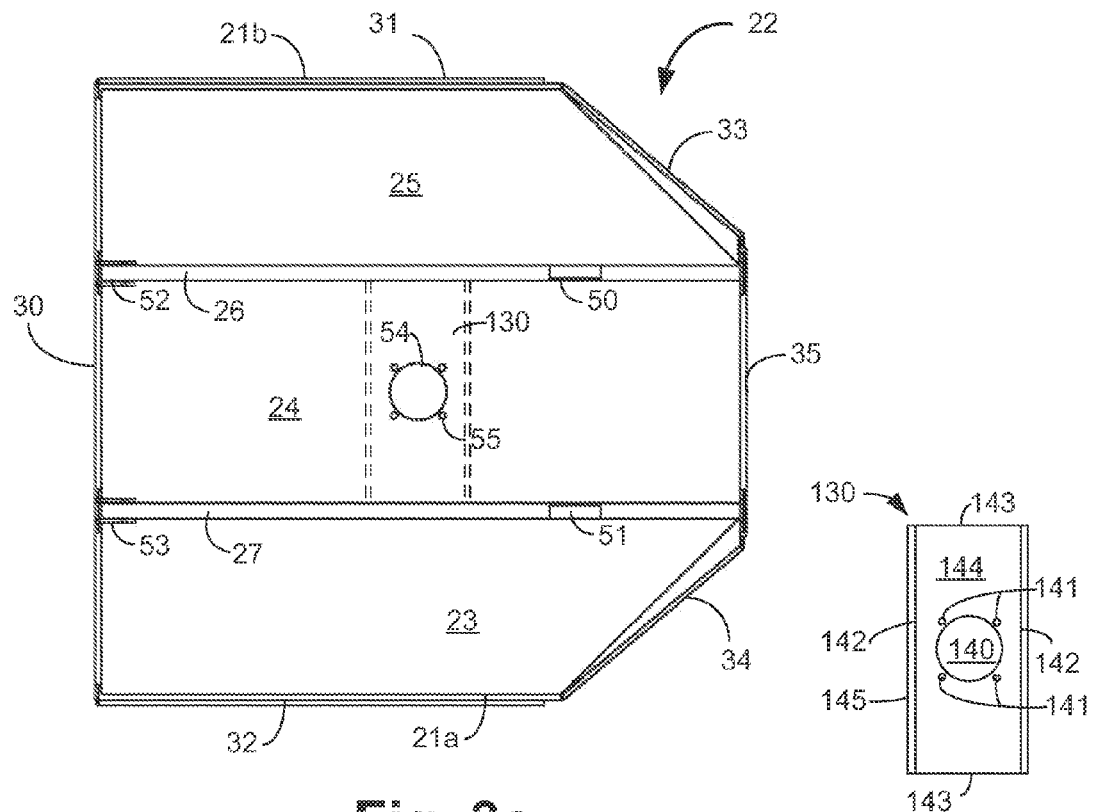
Fig. 3a
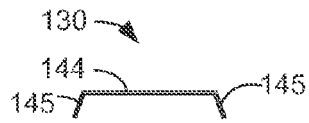
Fig. 3b
Fig. 3c
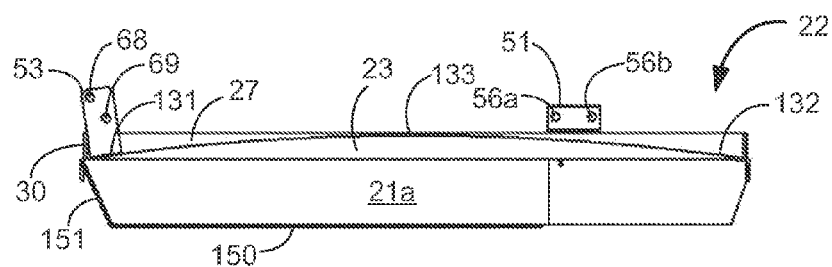
Fig. 4

CONCAVE DECK FLEXIBLE HITCH CUTTER

CROSS-REFERENCE TO RELATED APPLICATIONS

This application claims the benefit of U.S. Provisional Application No. 61/107,159 filed on Oct. 21, 2008, the entire contents of which are herein incorporated by reference.

FIELD OF THE INVENTION

The present invention relates generally to the field of tractor-based, rotary-driven power equipment, and more particularly relates to a rotary cutter.

BACKGROUND AND SUMMARY OF THE INVENTION

The cutter is attached to and is pulled behind a tractor that powers the cutter. In this regard, a gearbox on the cutter connects to the power take-off (PTO) of the tractor, which provides rotation to the gearbox. The gearbox translates the rotation from the PTO to rotary cutting blades that cut grass and other ground vegetation.

Prior art rotary cutters typically comprise flat cutting decks and rigid frames that attach the cutting decks to the tractor. The flat shape of the decks required that large flat plates of metal be used for the deck base. The cutter according to the present disclosure comprises a concave cutting deck whose concave shape provides rigidity of the deck. The concave deck is comprised of three curved deck plates welded to two supports running longitudinally down the deck. The deck design does not require a large contiguous metal plate, but rather uses smaller deck plates, thus reducing the cost of the decking materials.

In a prior art cutter, the lift arm assembly, which connects to a three point hitch of a tractor, is rigidly affixed to the deck. A three point hitch is an attachment on the rear of a tractor known by persons of skill in the art for attaching equipment to the tractor. A prior art cutter which is rigidly affixed to the tractor does not commonly flex or rotate to maintain the cutting blades in close proximity to the grass.

The cutter according to the present disclosure comprises a pivoting brace frame that allows flexing of the deck in two different ways. First, the cutter uses swiveling linkages to make the two connections between the cutting deck and bottom two legs of the three point hitch. These linkages permit rotation of the deck with respect to the bottom legs. The swiveling linkages allow the entire cutting deck to move with respect to the hitch, and allow side-to-side pivoting of about 10-15 degrees. Due to the swiveling linkages, when the cutter mows through a ditch, for example, one linkage may rotate up and the other down, so the deck will tilt and maintain the blade in closer proximity to the grass.

Second, the lift frame comprises a top pivot that allows the hitch to rotate in the longitudinal direction, such that the lift frame can pivot backwards.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 3a is a top view of an exemplary cutting deck in accordance with an embodiment of the present disclosure.

FIG. 3b is a top view of an exemplary gearbox plate in accordance with an embodiment of the present disclosure.

FIG. 3c is a side view of the gearbox plate of FIG. 3b.

FIG. 4 is a side view of the exemplary cutter deck illustrated in FIG. 3a.

FIG. 5 is a front view of the exemplary cutter deck illustrated in FIG. 3a.

DETAILED DESCRIPTION

Figure 1:
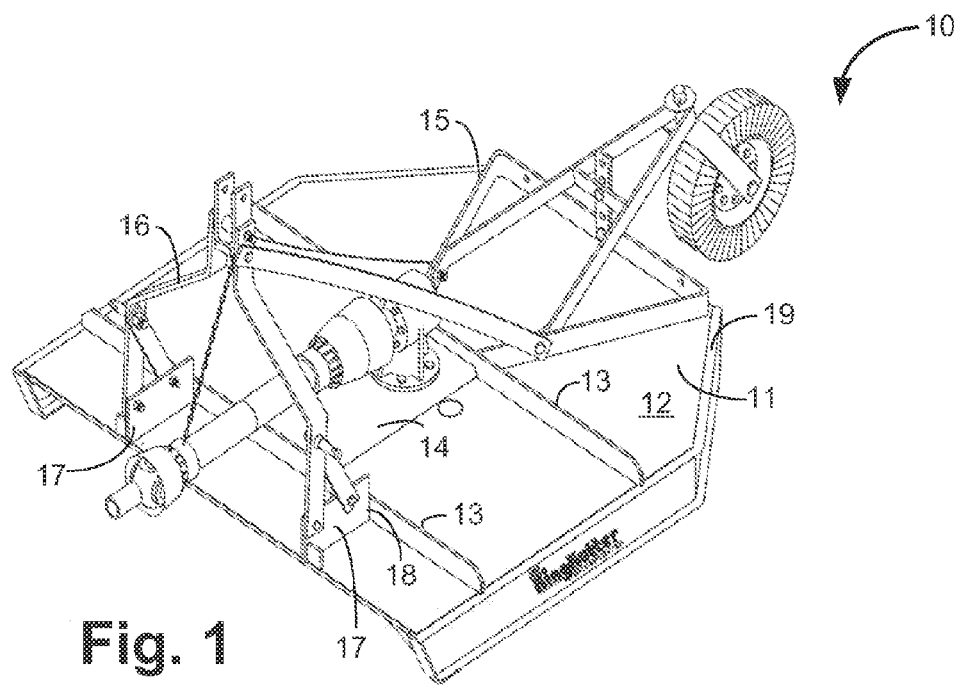
FIG. 1 depicts a prior art rotary cutter.

FIG. 1 depicts a prior art cutter 10. The cutter 10 comprises a cutting deck 11 which is formed from a single flat base 12 of sheet metal. The base 12 is generally horizontal and is supported on its side and front edges with an edge support frame 19. The base 12 is further reinforced with two transverse ribs 13. The transverse ribs 13 are comprised of vertically-oriented strips of sheet metal welded to the flat base 12. The base 12 is further reinforced by a rear support bracket 15. The rear support bracket 15 is comprised of a vertically-oriented strip of sheet metal formed in a partial trapezoidal shape and welded to the flat base 12.

The base 12 is further reinforced by two front support brackets 17. The front support brackets 17 are comprised of vertically-oriented sheets of sheet metal welded to the flat base 12. The front support brackets 17 further abut the transverse ribs 13 and are welded to the ribs 13 at the rear edge 18 of the front support brackets 17.

A lift arm assembly 16 rigidly connects to the front support brackets and provides connectivity to a standard three point hitch for connection to a tractor (not shown). The lift arm assembly 16 does not rotate with respect to the deck 11.

Figure 2:
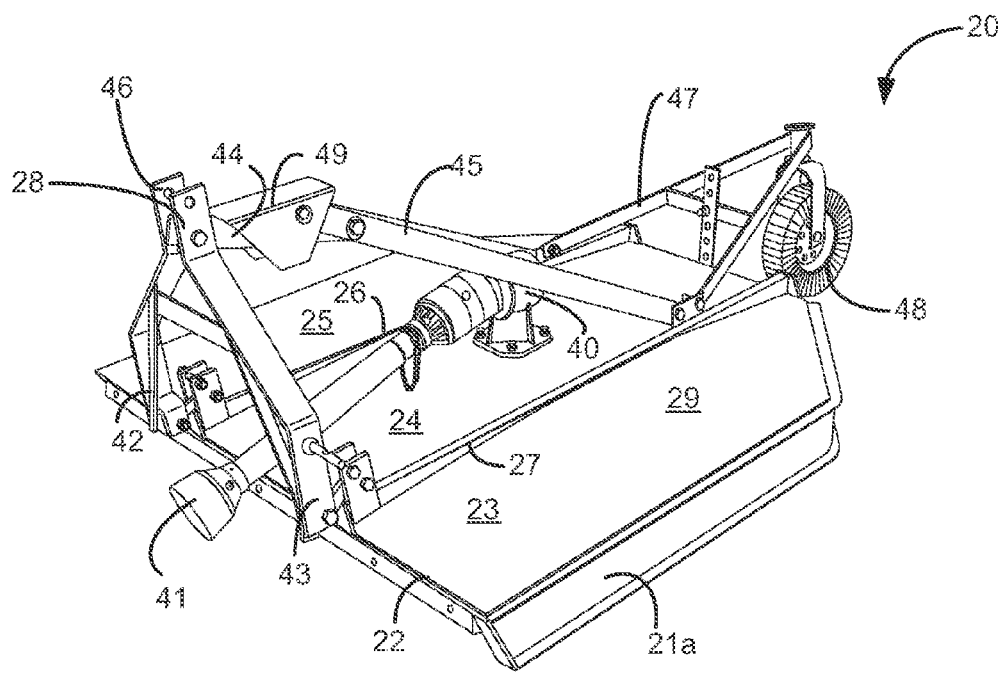
FIG. 2 is a front perspective view of an exemplary cutter in accordance with an embodiment of the present disclosure.

FIG. 2 depicts a front perspective view of a concave cutter 20 according to one embodiment of the present disclosure. The cutter 20 comprises a cutting deck 22 which is comprised of a top base 29 comprised of three plates: side plates 23 and 25 and center plate 24. The plates 23-25 are welded to two longitudinal supports 26 and 27, which provide structural stiffness to the deck 22. As is further discussed herein, the plates 23-25 are curved to form a concavely-shaped deck 22.

Two side blade guards 21a and 21b (FIG. 3a) are disposed on the sides of the deck 22. In one embodiment, the side blade guards 21a and 21b are comprised of a generally vertically-oriented strip of metal welded to the top base 29 along the sides of the deck 22, as further discussed herein. In other embodiments, the side blade guards 21a and 21b are comprised of an I-beam welded to the top base 29 along the sides of the deck 22.

A gearbox 40 connects to the cutting blades (not shown) on the underside of the deck 22. A shaft 41 connects the gearbox 40 to a tractor (not shown) to transfer rotation from the tractor to the blade through the gearbox 40. In this regard, the shaft 41 extends from the gearbox 40 and connects to the PTO (not shown) of the tractor (not shown). As is known by persons of skill in the art, a power take-off is a splined driveshaft on a tractor or truck that is used to provide power to an attachment or separate machines. The PTO provides rotation to the shaft 41 of the gearbox 40, which imparts rotation to the cutting blades (not shown).

The cutter 20 further comprises a lift frame 28 rotatably affixed to the deck 22. The lift frame 28 connects the cutter 20 to the tractor (not shown). The lift frame 28 comprises a stiff generally A-shaped frame with two legs 42 and 43 rotatably affixed to the deck 22. The lift frame 28 provides a standard three-point hitch connection to the tractor, as further discussed herein.

A pivot bar assembly 44 and a pivot brace assembly 45 connect a top end 46 of the lift frame 28 to the deck 22. In this regard, the pivot bar assembly 44 is rotatably connected between the top end 46 of the lift frame 28 and the pivot brace assembly 45. The pivot brace assembly 45 is rotatably connected to the longitudinal supports 26 and 27 of the deck 22. A pivot shield 49 covers the pivot bar assembly 44.

A wheel support frame 47 supports a wheel 48 which movably supports the deck 22. The wheel support frame 47 connects to the longitudinal supports 26 and 27 of the deck 22.

FIG. 3a depicts a top view of the deck 22. In one embodiment, the deck 22 is in the shape of a six-sided polygon with a front edge 30, generally parallel side edges 31 and 32, angled edges 33 and 34, and rear edge 35. In one embodiment, the longitudinal supports 26 and 27 comprise hollow tubing with a generally rectangular cross section. The left side plate 23 and the center plate 24 are welded to the left longitudinal support 27 and the right side plate 25 and the center plate 24 are welded to the right longitudinal support 26. An opening 54 in the center of the center plate 24 receives the gearbox 40 (FIG. 2). Four (4) small openings 55 surrounding the opening 54 receive fasteners (not shown) for affixing the gearbox 40 to the center plate 24.

A gearbox support plate 130 is disposed on the underside of the deck 22 and provides additional structural support for the gearbox 40. The gearbox support plate 130 is a generally rectangular plate (when viewed from the top view) extending between and welded to the left longitudinal support 27 and the right longitudinal support 26. The gearbox support plate 130 has downwardly extending legs (not shown), as illustrated in FIG. 3b.

Figure 5:
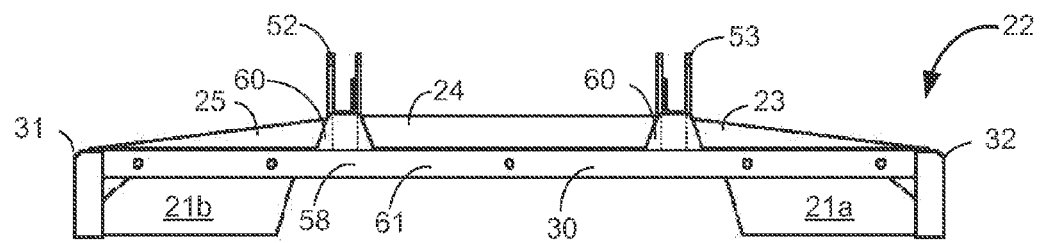
Figure 7:
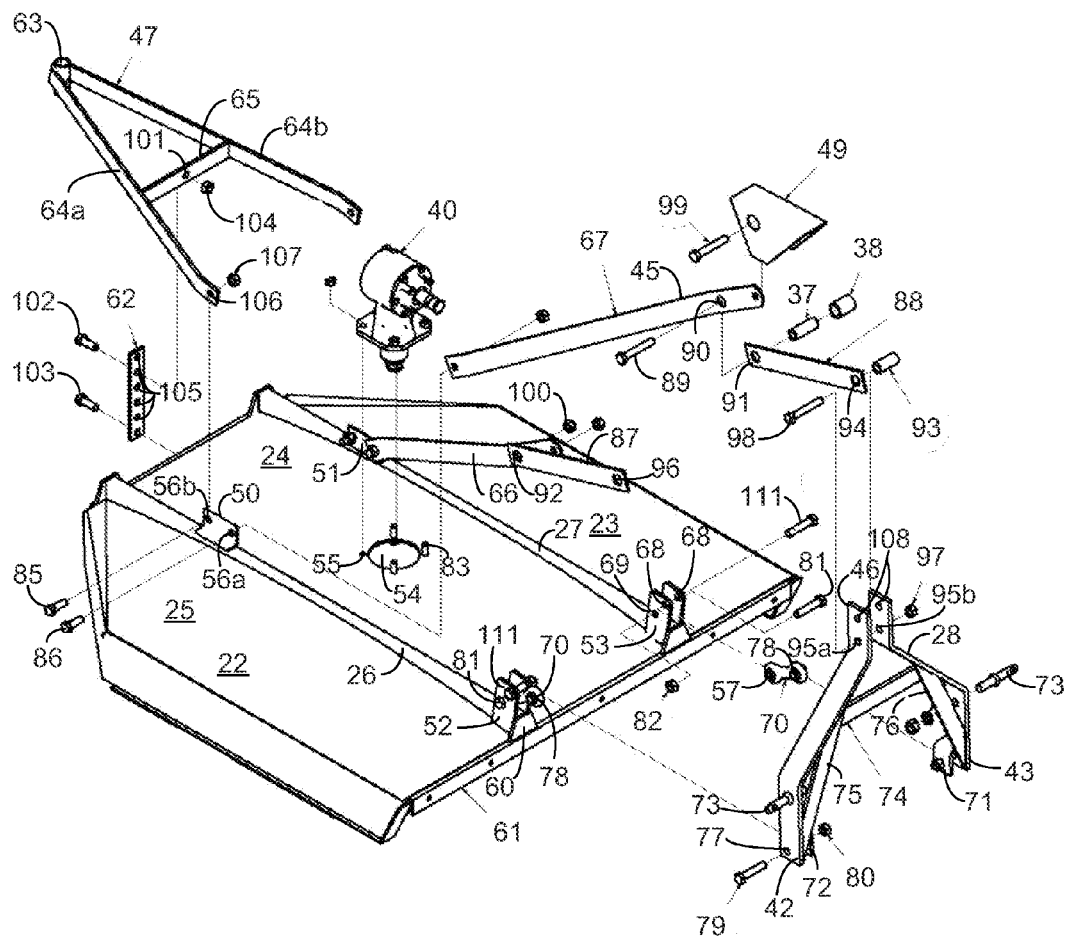
FIG. 7 is an exploded perspective view of the exemplary cutter illustrated in FIG. 2.

Two front brackets 52 and 53 connect the two legs 42 and 43 (FIG. 2) of the lift frame 28 to the deck 22 via swivel linkages 70 (FIG. 7). The two front brackets 52 and 53 comprise generally thin rectangular brackets welded to the front of the longitudinal supports 26 and 27, respectively. The front brackets 52 and 53 are each formed by welding two (2) pieces of flat bar material to each side of the longitudinal supports 26 and 27. The front brackets 52 and 53 form a U-shape when viewed from the front of the deck 22 (FIG. 5).

Two side blade guards 21a and 21b run along the sides of the deck 22 in one embodiment. Specifically, one side blade guard 21a is welded to the side edge 32 and angled edge 34, and another side blade guard 21b is welded to the side edge 31 and angled edge 33. The side blade guard in this embodiment is thus a piece of metal formed to abut the parallel and angled edges of the deck 22.

FIG. 3b is a top view of the gearbox support plate 130 of FIG. 130. In this embodiment, the gearbox support plate 130 comprises a generally flat top surface 144 that is affixed to the bottom surface (not shown) of the deck 22 (FIG. 3a). A central opening 140 is aligned with the opening 54 (FIG. 3a) on the center plate 24 (FIG. 3a) and receives the gearbox 40 (FIG. 2). Four (4) small openings 141 surrounding the opening 140 are aligned with the openings 55 (FIG. 3a) in the center plate 24 (FIG. 3a) for receiving fasteners (not shown) for affixing the gearbox 40 (FIG. 3a) to the center plate 24 (FIG. 3a).

The top surface 144 of the gearbox support plate 130 comprises short edges 143 and long edges 142 as shown. The short edges 143 connect fit between and are welded to the longitudinal supports 26 and 27 (FIG. 3a). The long edges 142 extend downwardly and form legs 145, as further illustrated in FIG. 3c.

FIG. 3c is a side view of the gearbox support plate 130 of FIG. 3b. The legs 145 extend downwardly at an angle and add structural support to the plate 130.

Two pivot brace brackets 50 and 51 connect the pivot brace assembly 45 (FIG. 2) and the wheel support frame 47 (FIG. 2) to the deck 22, as further discussed herein. In one embodiment, the pivot brace brackets 50 and 51 comprise a short angle iron welded to the longitudinal supports 26 and 27, respectively.

FIG. 4 depicts a left side view of the deck 22 of one embodiment of the present disclosure. The side blade guard 21a extends downwardly from the edges 32 and 34 of the deck 22. In embodiment, the side blade guard 21a is a thin strip of sheet metal. The side blade guard 21a shields the blade (not shown) and may protect users from flying debris. The side blade guard 21a further prevents the blade from contacting the ground. The side blade guard 21a comprises a skid 150, which is a flat bar that is welded to the bottom of the side blade guard 21a and extending up an angled front edge 151 of the side blade guard 21a. The skid 150 prevents the bottom edge and the angled front edge 151 of the side blade guard 21a from cutting into the ground when the cutter is in use.

The pivot brace bracket 51 extends upwardly from the longitudinal support 27 and comprises openings 56a and 56b that receive fasteners (not shown) for connecting the pivot brace assembly 45 (FIG. 2) to the bracket 51, and for connecting the wheel support frame 47 (FIG. 2) to the bracket 51, respectively. The pivot brace bracket 50 (FIG. 3a) similarly extends from the longitudinal support 26 and is a mirror image of the pivot brace bracket 51.

The front bracket 53 extends upwardly from the longitudinal support 27 at the front edge 30 of the deck 22. The front bracket 53 comprises openings 68 and 69 for receiving fasteners (not shown) for connecting the leg 43 (FIG. 2) of the lift frame 28 (FIG. 2) to the bracket 53. The openings 68 and 69 are shown on the visible leg of the U-shaped bracket 53. Identically-aligned openings are disposed on the other leg of the U-shaped bracket 53. The front bracket 52 (FIG. 3a) similarly extends from the longitudinal support 27 (FIG. 3a).

As can be seen in FIG. 4, the left side plate 25 has a curved concave shape, and its front and rear ends 131 and 132 are lower to the ground than its middle portion 133. Although not shown in FIG. 3a, this is also the case with the right side plate 23 (FIG. 3a) and the center plate 24 (FIG. 3a).

FIG. 5 depicts a front end view of the deck 22 according to one embodiment of the present disclosure. As shown in the figure, the front brackets 52 and 53 faun a U-shape. A front edge support 61 is affixed to the front edge 30 of the deck 22.

In one embodiment, the front edge support comprises a strip of angle iron welded to the deck 22 such that a horizontal surface (not shown) of the angle iron is welded to the deck and the vertical surface 58 extends downwardly from the deck.

Trapezoidal cover plates 60 are affixed to the ends of the longitudinal supports 26 and 27 (FIG. 3a) and are welded to the longitudinal supports 26 and 27, to the deck 22 and the front edge support 61, and also to the front edges of the brackets 52 and 53.

The plates 23-25 of the deck 22 together form a generally concave shape when viewed from the front in a somewhat similar manner that they form a concave shape when viewed from the side (FIG. 4). In this regard, the right side plate 25 and the left side plate 23 taper down from a high point at their central portion (not shown) down to the edges 31 and 32, respectively.

Figure 6:
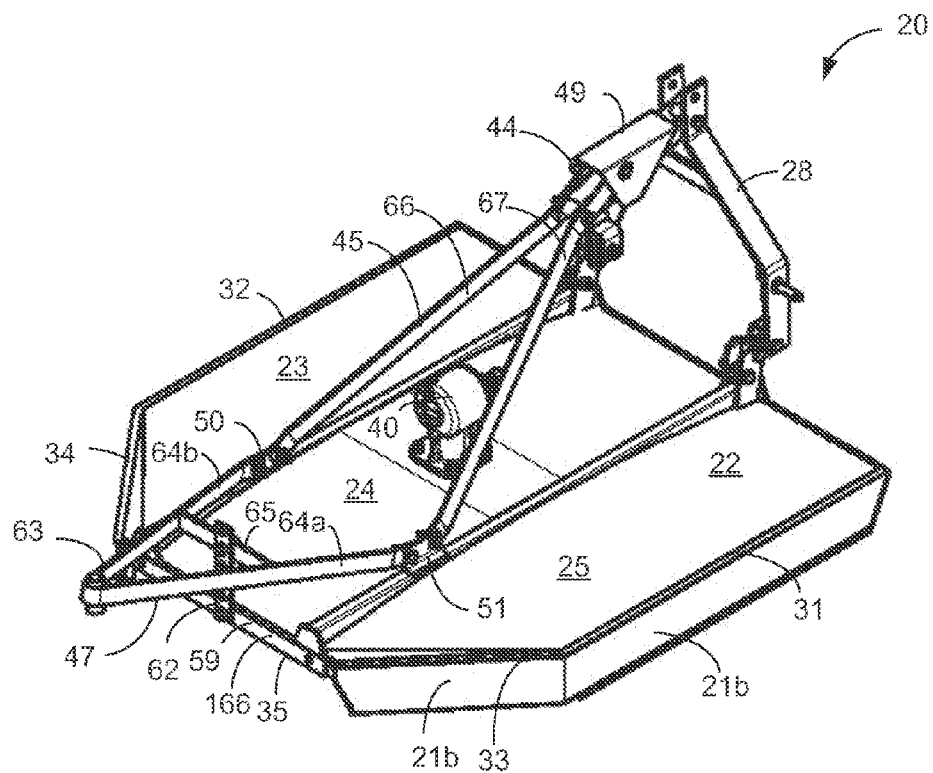
FIG. 6 is a rear perspective view of the exemplary cutter illustrated in FIG. 2.

FIG. 6 depicts a rear perspective view of the cutter 20 according to one embodiment of the present disclosure. The side blade guard 21b that runs along the edges 31 and 33, and the side blade guard 21a that runs along the edges 32 and 34 do not extend to the rear edge 35 in this embodiment. A rear edge support 66 is affixed to the rear edge 35 of the deck 22. In one embodiment, the rear edge support 166 comprises a strip of angle iron welded to the deck 22 such that a horizontal surface (not shown) of the angle iron is welded to the deck and the vertical surface 59 extends downwardly from the deck 22.

The wheel support frame 47 comprises two (2) angled legs 64a and 64b and a central support bar 65 forming an "A" shape with an opening 63 at the top of the "A" that receives the wheel assembly (not shown). The angled legs 64a and 64b are affixed to the two pivot brace brackets 50 and 51 via fasteners (not shown). A height adjuster bar 62 is adjustably fixed to the central support bar 65 on one end, and on the other end is affixed to the rear edge support 166 of the deck 22. The height adjuster bar 62 allows the distance between the cutting blade (not shown) and the grass (not shown) to be adjusted. In this regard, the height adjuster bar 62 comprises a plurality of spaced apart openings 105 (FIG. 7) in which a fastener 102 (FIG. 7) may be received to affix the height adjuster bar 62 to the central support bar 65. Reducing the distance between the deck 22 and the central support bar 65 by choosing an opening that is lower on the height adjuster bar 62 raises the blade, and conversely, increasing the distance between the deck 22 and the central support bar 65 by choosing an opening that is higher on the height adjuster bar 62 lowers the blade.

The pivot brace assembly 45 is comprised of two angled legs 66 and 67 rotatably affixed to the two pivot brace brackets 50 and 51 at their lower ends. At their top ends, the angled legs 66 and 67 are affixed to the pivot bar assembly 44. The pivot bar assembly 44 is comprised of two pivot bars 87 and 88 (FIG. 7) rotatably affixed to the angled legs 66 and 67. The pivot shield 49 covers the pivot bars.

FIG. 7 depicts an exploded perspective view of a cutter 20 according to one embodiment of the present disclosure. The lift frame 28 is comprised of two legs 42 and 43, a generally horizontal support brace 74, and angled supports 75 and 76. The angled supports 75 and 76 and the generally horizontal support brace 74 are welded to the two legs 42 and 43.

The lift frame 28 further comprises tabs 71 and 72 which are parallel to and offset from the legs 43 and 42. The tab 72 comprises an opening (not shown) which aligns with an opening 77 on the leg 42. (The tab 71 comprises an identical opening (not shown) which aligns with the opening (not shown) on leg 43.) The opening 77 receives a fastener 79 which rotatably receives a swivel linkage 70. In this regard, the swivel linkage 70 comprises an opening 78 through which the fastener 79 passes after the fastener passes through the opening 77 on the leg 42. The fastener is secured by a nut 80. When the cutter 20 is assembled, the swivel linkage 70 is thus disposed between the tab 72 and the leg 42. The leg 43 and tab 71 are mirror imaged to the leg 42 and tab 72 and also receive a swivel linkage 70 in an identical manner.

As discussed above, the swivel linkages 70 are rotatably affixed on one end to a fastener between the legs 42 and 43 and the tabs 71 and 72, respectively. On their lower ends, the swivel linkages 70 are rotatably affixed to the brackets 52 and 53. Specifically, the swivel linkage 70 is affixed to the bracket 53 via an opening 57 on the lower end of the swivel linkage 70, which is received by a fastener 81 that passes through the openings 69 on both legs of the bracket 53. A nut 82 secures the fastener within the bracket 53. The bracket 52 has an identical attachment mechanism to its swivel linkage 70.

A fastener 111 is received by the openings 68 on the bracket 53 and is secured by a nut 82. The purpose of the fastener 111 is to prevent the swivel linkage 70 from rotating too far; i.e., the fastener 111 acts as a stop to prevent the swivel linkage 70 from rotating upwardly beyond the fastener 111. The bracket 52 has an identical fastener 111 for the same purpose.

During operation of the cutter 20, the swivel linkages 70 may rotate around the fasteners 81 in a plane generally perpendicular to the fasteners 81 (i.e., a plane generally longitudinally down the deck 22). The swivel linkages also provide some lateral swiveling.

Two standard lift pins 73 known in the art are affixed to the legs 42 and 43 of the lift frame 28 and releaseably mate with the tractor (not shown).

The angled leg 67 (part of the pivot brace assembly 45) is attached at its lower end to the pivot brace bracket 50. In this regard, a fastener 86 is received by the opening 56a on the bracket 50, and the fastener 86 rotatably affixes the leg 67 to the bracket 50. The leg 66 is rotatably attached to the bracket 51 in the same manner.

The leg 66 is affixed at its upper end to the pivot bar 87, and leg 67 is affixed at its upper end to the pivot bar 88. In one embodiment, a fastener 89 affixes the legs 66, 67 and the bars 87, 88 together in a spaced-apart configuration as follows: The fastener first passes through an opening 90 in the leg 67, and then through an opening 91 in a rearward end of the pivot bar 88, and then through an opening in a bushing 37, and then through an opening in a spacer 38, and then through an opening 92 in a rearward end of the pivot bar 87 and then through an opening (not shown) in leg 66 and then is secured by a nut 100.

The bushing 37 is a generally cylindrical tube that receives and surrounds the fastener 89. In this regard, the bushing 37 fits within the openings 90 in leg 67, the opening 91 in bar 88, the opening in the spacer 38, the opening 92 in the bar 87, and the opening (not shown) in leg 66, and provides a cylindrical surface for the legs 66, 67 and bars 87, 88 to rotate around.

The spacer 38 is a generally cylindrical tube that is received by the bushing and maintains the leg 66 and bar 87 in a spaced-apart orientation from the leg 67 and bar 88. In this regard, the spacer 38 contacts and separates the bars 88 and 87.

Although the embodiment of FIG. 7 shows bars 88 and 87 as separate and discrete items, in other embodiments the bars 88 and 87 are welded together as one weldment. In this regard, the bars 88 and 87 may be welded together with a spacer bar between, with bar 88 parallel to and aligned with bar 87.

A pivot shield 49 covers the pivot bars 87 and 88 and is affixed by a fastener 99. The pivot shield protects the user (not shown) from injury by pinching between the pivot bars 87 and 88 and the legs 66 and 67.

The forward ends of the pivot bars 87 and 88 are rotatably affixed to the top end 46 of the lift frame 28. In this regard, a fastener 98 first passes through an opening 95a on the lift frame 28, and then passes through an opening 94 on the pivot bar 88 and then passes through a bushing 93, and then passes through an opening 96 on the pivot bar 87, and then passes through an opening 95b on the lift frame 28 and is secured by a nut 97. The bushing 93 is a generally cylindrical tube that is received by the fastener 98 and provides a cylindrical surface for the bars 87 and 88 to rotate around.

Openings 108 in the top 46 of the lift frame 28 receive a standard lift pin (not shown) for connection to the three point hitch (not shown) of the tractor (not shown).

The opening 54 in the deck 22 receives the gearbox 40, which is secured to the deck 22 by fasteners 83 passing through openings 55.

The leg 64a of the wheel support frame 47 connects to the pivot brace bracket 50 via a fastener 85 which is received by the opening 56b in the bracket 50, and by the opening 106 in the leg 64a. A nut 107 secures the fastener 85. The other leg 64b of the wheel support frame 47 is similarly attached to the bracket 51.

The height adjuster bar 62 is affixed to the deck 22 via a fastener 103 and a nut (not shown). The height adjuster bar 62 is adjustably affixed to the central support bar 65 via a fastener 102 that passes through one of the plurality of spaced apart openings 105 in the bar 62 and then through an opening 101 in the central support bar 65. A nut 104 secures the fastener 102.

Figure 8:
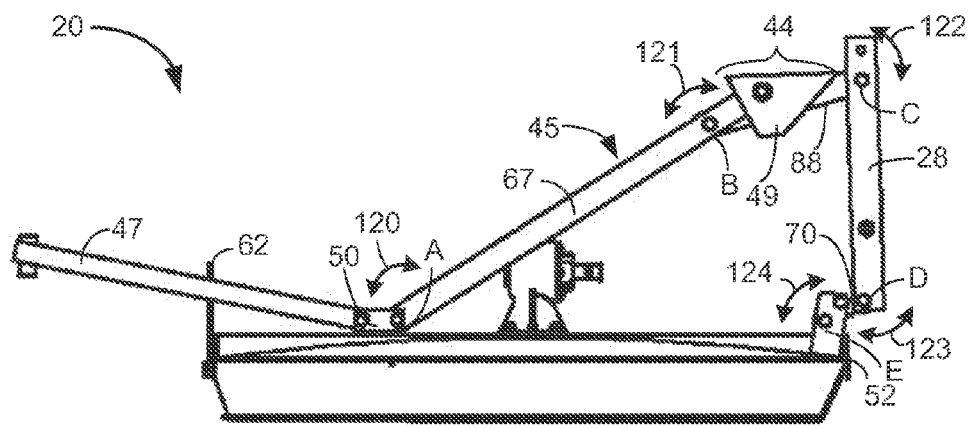
FIG. 8 is a side view of the exemplary cutter illustrated in FIG. 2.

FIG. 8 depicts a side view of the exemplary cutter 20 illustrated in FIG. 2. In operation of the cutter 20, the angled leg 67 of the pivot brace assembly 45 is rotatable around point "A" (i.e., the joint between the leg 67 and the bracket 50), in the direction indicated by direction arrow 120.

The angled leg 67 is rotatably affixed to the pivot bar 88 such that the leg 67 and bar 88 may rotate around a point "B" (i.e., the joint between the leg 67 and the bar 88) in the direction indicated by direction arrow 121. Though not pictured, angled leg 66 (FIG. 7) and pivot bar 87 are mirror imaged to legs 67 and bar 88 and rotate in the same manner.

The pivot bar 88 and the lift frame 28 are rotatable around a point "C" (i.e., the joint between the bar 88 and the frame 28) in the direction indicated by direction arrow 122. Though not pictured, pivot bar 87, which is a mirror image to bar 88, rotates in the same manner.

The swivel linkages 70 and the lift frame 28 are rotatable around a point "D" (i.e., the joint between the swivel linkage 70 and the lift frame 28) in the direction indicated by direction arrow 123.

The swivel linkages 70 are rotatably affixed to brackets 52 (and 53, not shown) and in this regard are rotatable around point "E" (i.e., the joint between the swivel linkage 70 and the bracket 52) in the direction indicated by direction arrow 124.

Figure 9:
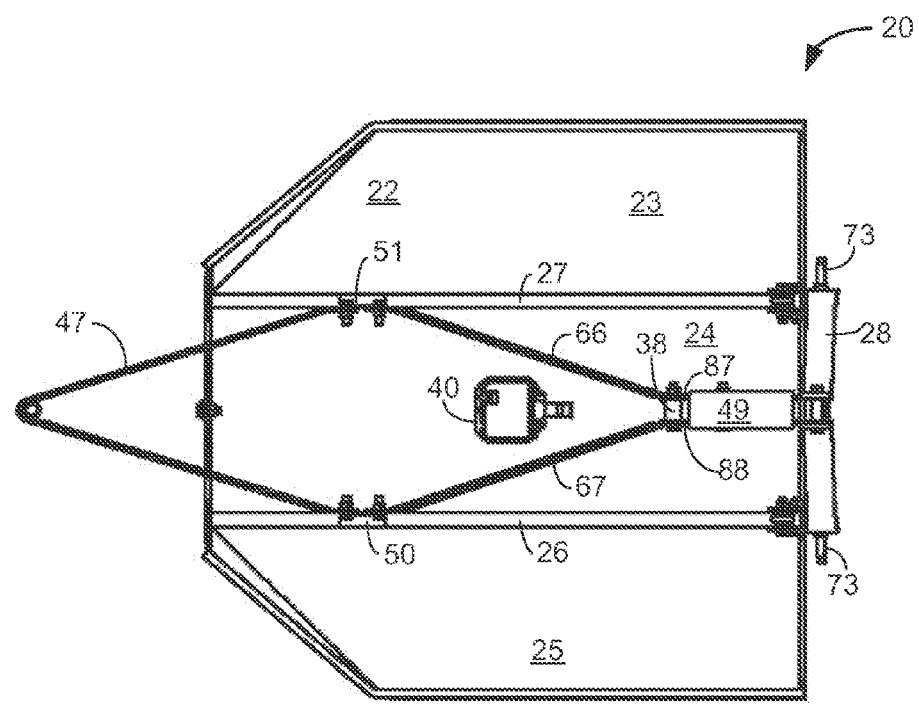
FIG. 9 is a top view of the exemplary cutter illustrated in FIG. 2.

FIG. 9 depicts a top view of the exemplary cutter 20 illustrated in FIG. 2. As was discussed above with respect to FIG. 7, leg 66 is rotatably affixed to the pivot bar 87, and leg 67 is rotatably affixed to the pivot bar 88. The spacer 38 maintains leg 66 and bar 87 in spaced apart orientation with respect to leg 67 and bar 88, as shown.

What is claimed is:

1. A single-deck rotary cutter comprising:
   a mower deck consisting of a single deck, the deck consisting of three longitudinally-extending panels: a right side panel, a middle panel, and a left side panel, the panels each comprising a concavely-curved surface with front and back edges curving downwardly from a middle portion, the right and left side panels each tapering from a high point at a central portion of the right and left side panels down to an outermost edge of the right and left side panels;
   a gearbox connected to the middle panel on a top side of the deck;
   at least one cutting blade rotatably connected to the gearbox;
   a generally vertical lift frame rotatably affixed at its lower end of the vertical lift frame to a front end of the deck for rotatably connecting the cutter to a standard three point hitch; and
   a top pivot rotatably connecting a top end of the lift frame to braces rotatably connecting to a rear end of the deck;
   wherein the three longitudinally-extending panels are welded to two longitudinal supports.

2. The cutter of claim 1, wherein the longitudinal supports comprise tubing with a rectangular cross section.

3. The cutter of claim 1, wherein the lift frame comprises a rigid generally A-shaped frame with two legs rotatably affixed to the deck.

4. A rotary cutter consisting of a single deck,
   the deck comprising three longitudinally-extending panels: a right side panel, a middle panel, and a left side panel, the panels each comprising a substantially smooth and seamless panel with a concavely-curved surface and front and back edges curving downwardly from a middle portion,
   the right side panel tapering from a high point at a central portion of the right side panel down to an outermost edge of the right side panel, the left side panel tapering from a high point at a central portion of the left side panel down to an outermost edge of the left side panel,
   the deck further comprising a right longitudinal support disposed between and rigidly affixed to the right side panel and the middle panel, the right longitudinal support comprising tubing with a rectangular cross section,
   the deck further comprising a left longitudinal support disposed between and rigidly affixed to the left side panel and the middle panel, the left longitudinal support comprising tubing with a rectangular cross section,
   a gearbox support plate extending between the right longitudinal support and the left longitudinal support, the gearbox support plate comprising a substantially rectangular plate with short opposed ends welded to the left longitudinal support and the right longitudinal support, the gearbox support plate rigidly affixed to a bottom surface of the middle panel,
   a generally vertical lift frame rotatably affixed at a lower end of the vertical lift frame, to a front end of the deck for rotatably connecting the cutter to a standard three point hitch, and
   a top pivot rotatably connecting a top end of the lift frame to braces rotatably connecting to a rear end of the deck.

5. The cutter of claim 4, wherein the gearbox support plate further comprises long opposed ends substantially perpendicular to the short opposed ends, the long opposed ends comprising angularly-extending legs.

6. The cutter of claim 4, wherein a length of the gearbox support plate at the long opposed ends is substantially narrower than a length of deck as measured between a front edge and a rear edge of the deck.

* * * * *

UNITED STATES PATENT AND TRADEMARK OFFICE
CERTIFICATE OF CORRECTION

| | | |
|---|---|---|
| PATENT NO. | : 8,393,136 B1 | Page 1 of 1 |
| APPLICATION NO. | : 12/603408 | |
| DATED | : March 12, 2013 | |
| INVENTOR(S) | : J. Phillip Fraley et al. | |

It is certified that error appears in the above-identified patent and that said Letters Patent is hereby corrected as shown below:

Title Page, Item (73) Assignee's name should be changed from "Kink Kutter, Inc." to
-- King Kutter, Inc. --.

Signed and Sealed this
Fifth Day of November, 2013

Teresa Stanek Rea
*Deputy Director of the United States Patent and Trademark Office*